United States Patent
Allocca et al.

(10) Patent No.: US 8,813,066 B2
(45) Date of Patent: Aug. 19, 2014

(54) MULTI-COMPONENT SOFTWARE APPLICATION INSTALLATION FACILITY

(75) Inventors: Danilo Allocca, Cercola (IT); Claudio De Ingeniis, Rome (IT); Pietro Marella, Rome (IT); Gianluca Mariani, Rome (IT); Martha Pinelo, Rome (IT); Riccardo Rossi, Rome (IT); Gianluca Seghetti, Pomezia (IT); Ignazio Trovato, Rome (IT); Massimo Marra, Rome (IT); Mario Noioso, Pozzuoli (IT)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 12/410,652

(22) Filed: Mar. 25, 2009

(65) Prior Publication Data
US 2009/0282402 A1    Nov. 12, 2009

(30) Foreign Application Priority Data
May 6, 2008    (EP) ................................. EP08155733

(51) Int. Cl.
*G06F 9/44*    (2006.01)
*G06F 9/45*    (2006.01)

(52) U.S. Cl.
USPC ........................... 717/175; 717/176; 717/120

(58) Field of Classification Search
None
See application file for complete search history.

(56) References Cited

U.S. PATENT DOCUMENTS

| | | | |
|---|---|---|---|
| 6,262,726 B1 * | 7/2001 | Stedman et al. ............... | 715/745 |
| 6,434,744 B1 * | 8/2002 | Chamberlain et al. ........ | 717/168 |
| 6,442,754 B1 * | 8/2002 | Curtis ............................ | 717/175 |
| 6,687,902 B1 * | 2/2004 | Curtis et al. ................... | 717/175 |
| 6,698,018 B1 | 2/2004 | Zimniewicz et al. | |
| 6,775,829 B1 * | 8/2004 | Kroening ....................... | 717/175 |
| 6,795,814 B1 * | 9/2004 | O'Neal, IV .................... | 717/175 |
| 6,928,644 B1 * | 8/2005 | Kroening et al. .............. | 717/175 |
| 6,948,059 B1 * | 9/2005 | Sprecher et al. ............... | 713/100 |
| 6,981,252 B1 * | 12/2005 | Sadowsky ...................... | 717/176 |

(Continued)

FOREIGN PATENT DOCUMENTS

EP    1096374 A2    5/2001

OTHER PUBLICATIONS

Deng et al., "DAnCE: A QoS-enabled Component Deployment and Configuration Engine", 2005, Proceedings of the $3^{rd}$ Working Conference on Component Deployment; <retrieved on Oct. 6, 2012>; Retrieved from Internet <URL:http://www.dre.vanderbilt.edu/~schmidt/DAnCE.pdf>; pp. 1-15.*

(Continued)

*Primary Examiner* — Xi D Chen
(74) *Attorney, Agent, or Firm* — Nelson and Nelson; Daniel P. Nelson; Alexis V. Nelson

(57) ABSTRACT

A method is presented for installing a software application on a data processing system that may include multiple data processing entities. The software application may include multiple components for installation on one or more of the entities. The method may include providing input information for each of the components designated for installation. Each component may then be installed according to its corresponding input information, and output information corresponding to each component may be generated. This output information may be provided to one or more data processing entities identified for installation of a subsequent component. The input information corresponding to the subsequent component may be at least partially determined from this output information.

19 Claims, 13 Drawing Sheets

(56) References Cited

U.S. PATENT DOCUMENTS

| | | | | |
|---|---|---|---|---|
| 7,146,640 | B2* | 12/2006 | Goodman et al. | 717/120 |
| 7,206,828 | B1 | 4/2007 | Bourke-Dunphy et al. | |
| 7,334,226 | B2* | 2/2008 | Ramachandran et al. | 717/177 |
| 7,398,480 | B2* | 7/2008 | Zimniewicz et al. | 715/841 |
| 7,448,033 | B1* | 11/2008 | Kruger et al. | 717/175 |
| 7,735,060 | B2* | 6/2010 | Harvey et al. | 717/175 |
| 7,735,078 | B1 | 6/2010 | Vaidya | 717/171 |
| 7,756,955 | B2* | 7/2010 | Takagi | 717/176 |
| 8,010,777 | B2* | 8/2011 | Nandan et al. | 713/100 |
| 8,225,307 | B2* | 7/2012 | Baker et al. | 717/120 |
| 8,464,249 | B1* | 6/2013 | Goldman et al. | 717/176 |
| 8,589,912 | B2* | 11/2013 | Hinton et al. | 717/176 |
| 8,595,700 | B2* | 11/2013 | Huang et al. | 717/176 |
| 8,627,306 | B2* | 1/2014 | Meiss et al. | 717/120 |
| 2002/0069178 | A1* | 6/2002 | Hoffman | 705/64 |
| 2002/0133814 | A1 | 9/2002 | Bourke-Dunphy et al. | |
| 2003/0149736 | A1* | 8/2003 | Berkowitz et al. | 709/213 |
| 2004/0143746 | A1* | 7/2004 | Ligeti et al. | 713/185 |
| 2005/0193366 | A1* | 9/2005 | Boland et al. | 717/176 |
| 2006/0026589 | A1* | 2/2006 | Schneider et al. | 717/174 |
| 2007/0214028 | A1 | 9/2007 | Stich et al. | |
| 2008/0244563 | A1* | 10/2008 | Sonkin et al. | 717/175 |
| 2009/0007094 | A1* | 1/2009 | Hinton et al. | 717/175 |
| 2009/0007097 | A1* | 1/2009 | Hinton et al. | 717/176 |
| 2009/0089776 | A1* | 4/2009 | Sonkin et al. | 717/174 |

OTHER PUBLICATIONS

Bloom, et al., "IT-Management Software Deployment: Field Findings and Design Guidelines", 2008 ACM; [retrieved on Jan. 24, 2014]; Retrieved from Internet <URL:http://dl.acm.org/citation.cfm?id=1477973>;pp. 1-2.*

Brandman, Stanley, "Patching the Enterprise"; 2005 ACM; [retrieved on Jan. 24, 2014]; Retrieved from Internet <URL:http://dl.acm.org/citation.cfm?id=1053331>;pp. 32-39.*

Malek, et al., "An Extensible Framework for Improving a Distributed Software System's Deployment Architecture"; 2012 IEEE; [retrieved on Jan. 24, 2014]; Retrieved from Internet <URL:http://ieeexplore.ieee.org/stamp/stamp.jsp?tp=&arnumber=5680912>;pp. 73-100.*

Tian, et al., "A Novel Software Deployment Method Based on Installation Packages"; 2010 IEEE; [retrieved on Jan. 24, 2014]; Retrieved from Internet <URL:http://ieeexplore.ieee.org/stamp/stamp.jsp?tp=&arnumber=5562875>;pp. 228-233.*

* cited by examiner

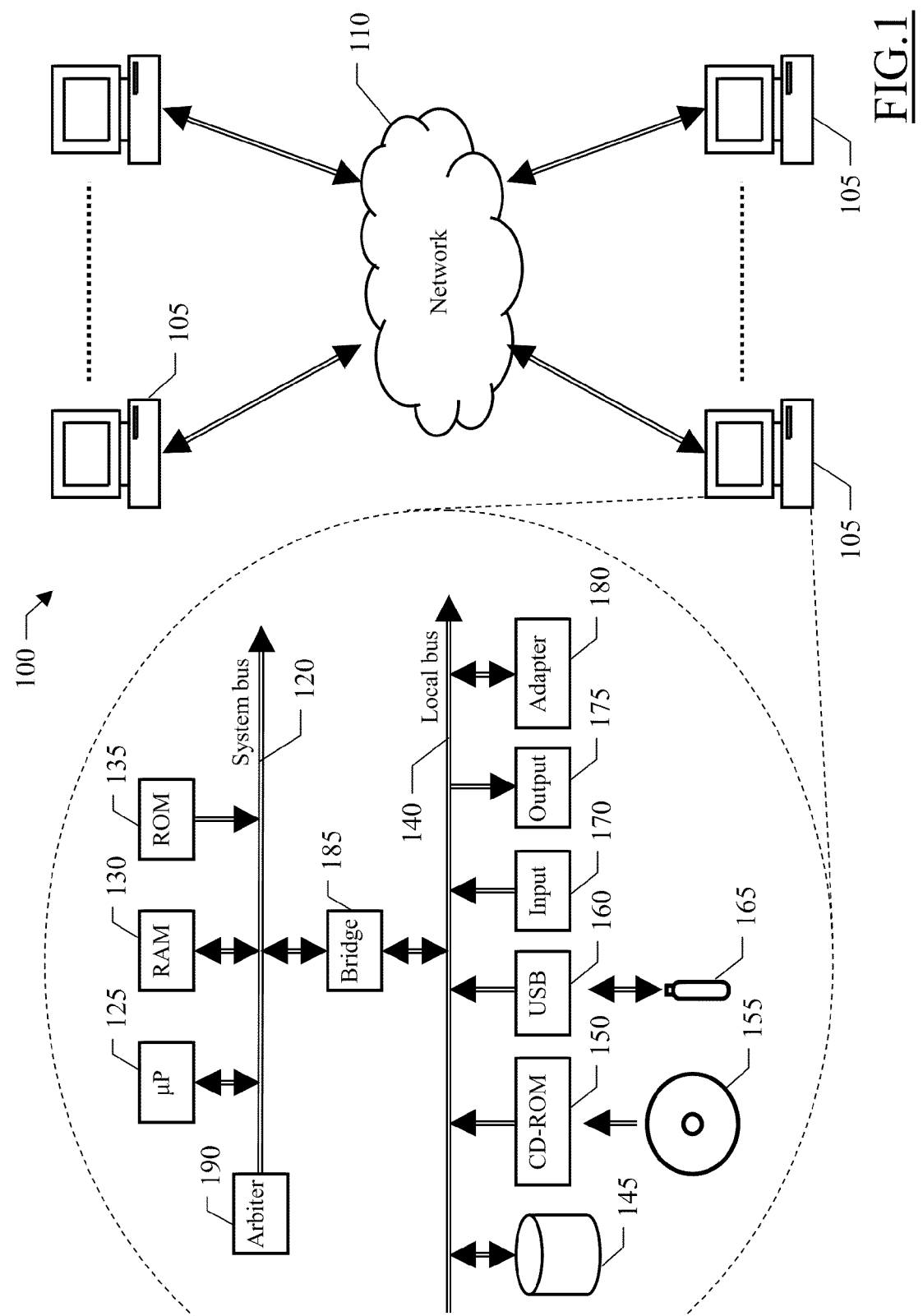

MULTI-COMPONENT SOFTWARE APPLICATION INSTALLATION FACILITY

BACKGROUND

Successful software application installation is critical in modern data processing systems, for example, in large networks with numerous computers. Such installation may be particularly complex where applications include multiple software components for installation on various computers. In this case, it is important that the components be configured correctly to interact properly across the application.

Certain software distribution tools are available to automate deployment of the different components from a central site. Generally, such tools require setting up a complex infrastructure for distributing software packages (corresponding to the components to be installed) to the desired computers. Typically, a dedicated agent on each computer receives and applies the software packages.

Alternatively, a standard installer may be used. In this case, an installation package may be provided for each component. The installation package may embed an image of the component and software code for controlling its installation. The installation package may be loaded onto and launched from the computer designated for installation of the component. The installation package may collect configuration information for the component at run-time. In some cases, this information may be collected by interacting with a system administrator through corresponding panels. The component may then be installed on the computer and configured accordingly.

SUMMARY

Embodiments of the invention have been developed to facilitate installing multi-component software applications on a computer system.

One embodiment of the invention includes a method for installing a software application on a data processing system that may include multiple data processing entities. The software application may include multiple components for installation on one or more of the entities.

The method may include providing input information for each of the components designated for installation. Each component may then be installed according to its corresponding input information, and output information corresponding to each component may be generated. This output information may be provided to one or more data processing entities identified for installation of a subsequent component. The input information corresponding to the subsequent component may be at least partially determined from this output information.

A corresponding computer program product and system are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 1 is a schematic block diagram of a data processing system that may be used to practice embodiments of the invention;

DETAILED DESCRIPTION OF THE INVENTION

Figure 2A:
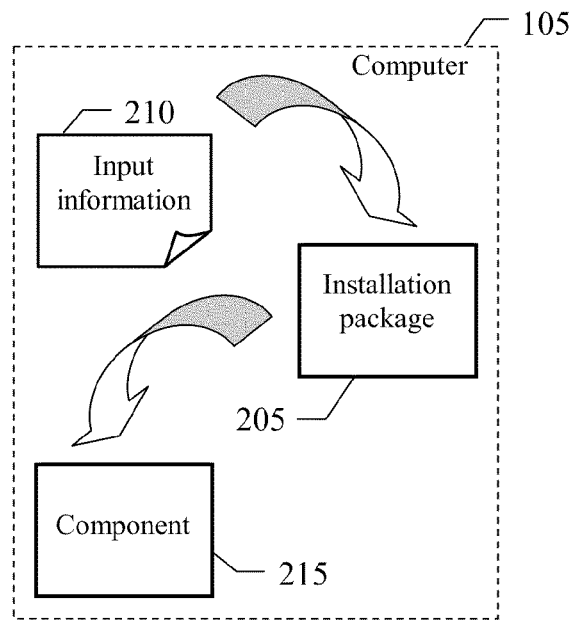
FIGS. 2A-2D illustrate a sequence of operations that may be executed by a method in accordance with an embodiment of the invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a data processing system 100 may be used to practice embodiments of the invention. The system 100 may include a distributed architecture having a plurality of computers 105 (for example, PCs). The computers 105 may communicate through a network 110 such as a LAN.

A generic computer 105 may include several units connected in parallel to a system bus 120. In detail, one or more microprocessors (µP) 125 may control operation of the computer 105. A RAM 130 may be directly used as a working memory by the microprocessors 125, and a ROM 135 may store basic code for a bootstrap of the computer 105. Several peripheral units may be clustered around a local bus 140 by means of respective interfaces.

Particularly, a mass memory may include one or more hard-disks 145, drives 150 for reading DVD- or CD-ROMs 155, and USB ports 160 for connecting (reading/writing) a number of external devices, such as pen-drives 165. The computer 105 may also include input units 170 (for example, a keyboard and a mouse), and output units 175 (for example, a monitor and a printer). An adapter 180 may be used to connect the computer 105 to the network 110. A bridge unit 185 may interface the system bus 120 with the local bus 140. Each microprocessor 125 and the bridge unit 185 may operate as a master agent requesting access to the system bus 120 for transmitting information. An arbiter 190 may manage granting access with mutual exclusion to the system bus 120.

Software applications implementing complex solutions may be installed on the system 100. Particularly, each application may include multiple software components (each one typically consisting of a commercial product), which may be installed on different computers 105. In one embodiment, for example, the entire application may be a comprehensive resource management solution which includes components such as a monitoring product, a provisioning product, a scheduling product, and the like.

Each component may be installed and configured individually on one or more computers 105 by means of a corresponding installation package. Such an installation package may embed an image of the component and software code for controlling its installation. Accordingly, the installation package may require corresponding configuration information, which may be entered manually by a system administrator through corresponding panels of a Graphical User Interface ("GUI").

The configuration information may include local configuration parameters used to set up the correct operation of the component individually (for example, for selecting a folder of the component, its features, and so on). The configuration information may also include global configuration parameters used to enable the component to interact with the other components of the application (for example, an identifier of a common working domain, its access password, and so on).

The installation package may also collect environmental information corresponding to the computer 105 identified for component installation. This environmental information may include, for example, environmental indicators representing hardware and/or software characteristics of the computer 105. In one embodiment, such information may be determined automatically via a corresponding scanner. The environmental indicators may be used by the installation package to verify whether local conditions required for installation of the component (such as the availability of specific hardware and/or software characteristics) have been met. Installation of the component may be enabled or prevented accordingly.

A sequence of operations that may be executed by an embodiment of the invention is illustrated in FIGS. 2A-2D. Particularly, as shown in FIG. 2A, an installation package 205 may be loaded onto the computer 105 when a corresponding component of the application requires installation.

As described in more detail below, input information 210 required for installing the component may be supplied to the installation package 205. Input information may include, for example, the required configuration information (i.e., the local configuration parameters and/or the global configuration parameters of the component), and environmental information about the hardware and/or software characteristics of the computer 105.

The input information may also include global status information. This status information may include, for example, status indicators representing a current status of the installation of the application (i.e., of its different components). The status indicators may likewise be used to verify whether global conditions required for installation of the component, such as the availability of the corresponding prerequisite components on the other computers, have been met. Installation of the component may be enabled or prevented accordingly. If global conditions have been met, the installation package 205 may install and configure the component 215 on the computer 105.

Figure 2B:
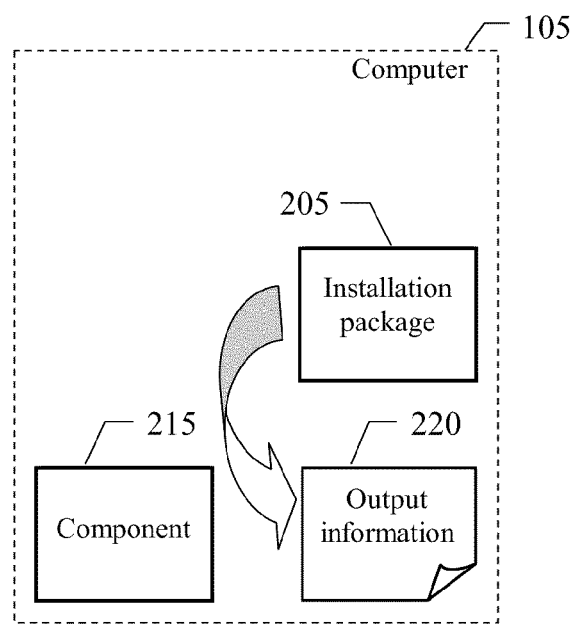

As shown in FIG. 2B, the installation package 205 may generate output information 220 in response to installation of the component 215. Output information 220 may include, for example, known global configuration parameters of the application, or at least those to be used by the components not yet installed. Output information 220 may further include current status indicators updated according to installation of the component 220.

Figure 2C:
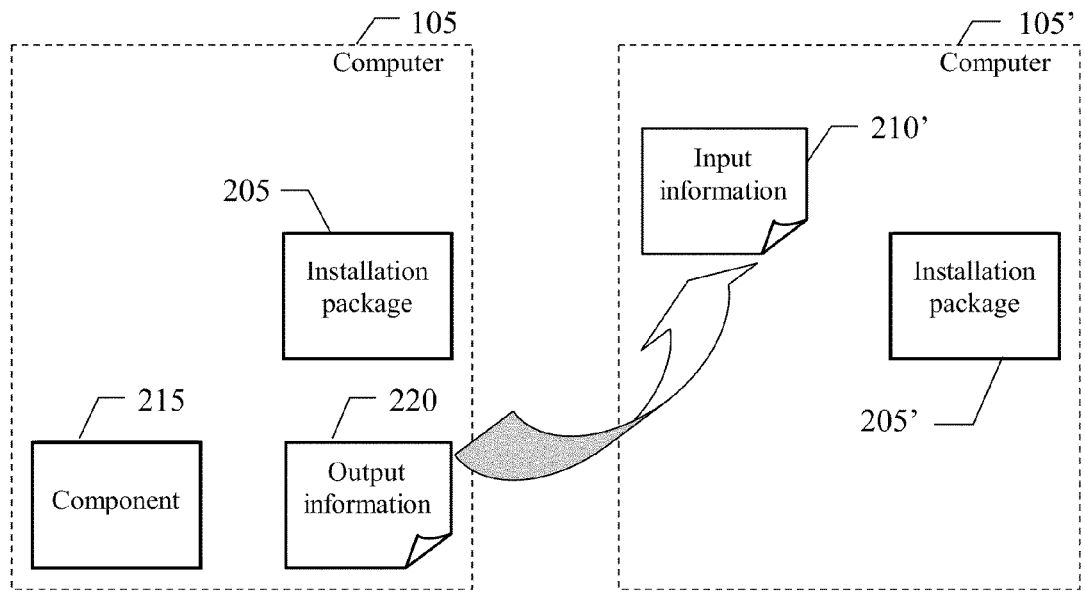

Referring now to FIG. 2C, the output information 220 may be provided to a second computer 105' designated for installation of a second component of the application. Particularly, the output information 220 from the first computer 105 may be used to determine, at least in part, the input information 210' for the installation package 205' on the second computer 105'. For example, in one embodiment, the global configuration parameters and the status indicators of the input information 210' may be set to the corresponding values in the output information 210. Any additional input information 210' that may not be provided by the output information 220 may instead be collected as usual. In one embodiment, for example, such additional input information 210' may be collected by prompting the system administrator to enter new global configuration parameters and local configuration parameters, and/or by automatically determining environmental indicators.

Figure 2D:
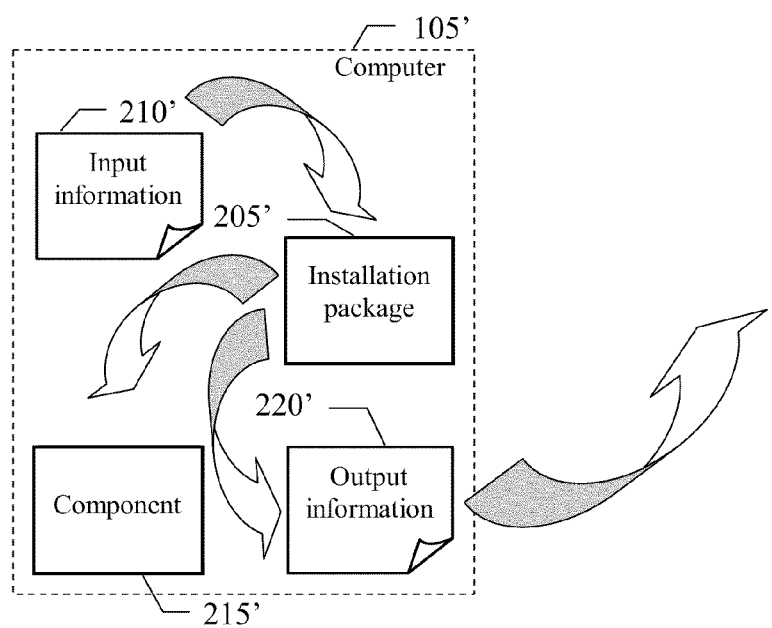

With reference now to FIG. 2D, the installation package 205' may install and configure the component 215' on the second computer 105' according to the corresponding input information 210' as set forth above. The installation package 205' may then generate the output information 220' as a result of installation of the component 215'. This output information 220' may be provided to another computer (not shown) to iteratively perform the same operations for additional components, until the entire application has been installed.

Embodiments of the above-described solution make it possible to automate, at least in part, the installation of applications having multiple components distributed on different computers. Indeed, such installation may be facilitated even where a standard installer is used with no complex software distribution infrastructure.

Moreover, embodiments of the present invention may not require completely defining installation of the entire application in advance. Indeed, the information required for installation of the different components of the application may be defined incrementally during the installation process. In one embodiment, for example, the information may be incrementally provided at run-time of each component. This flexibility may enable the installation process to continue without interruption or problem, even when changes are decided on the fly. For example, if installation of a component on a specific computer fails, the same operation may be repeated on another computer without adversely affecting the entire installation process.

In some embodiments, status indicators passed between the components of the application may facilitate ensuring that the components are installed in a proper sequence. This may be significant, for example, in embodiments where a component may be installed only when all prerequisite components are available.

Global configuration parameters may facilitate verifying the accuracy and integrity of the entire application. Indeed, common values used for the different components may ensure the coherence of their configurations. Moreover, these common values may be required to be entered only once, thus further facilitating the installation process and strongly reducing the possibility of errors.

Several techniques may be used to pass the required input/output information 210, 220 between components to be installed. Some embodiments may utilize a transfer unit such as a removable memory device, a network connection, or a manual input device such as a keyboard. An exemplary application of an embodiment of the invention utilizing a removable memory device for this purpose is shown in FIGS. 3A-3D and described in more detail below.

Figure 3A:
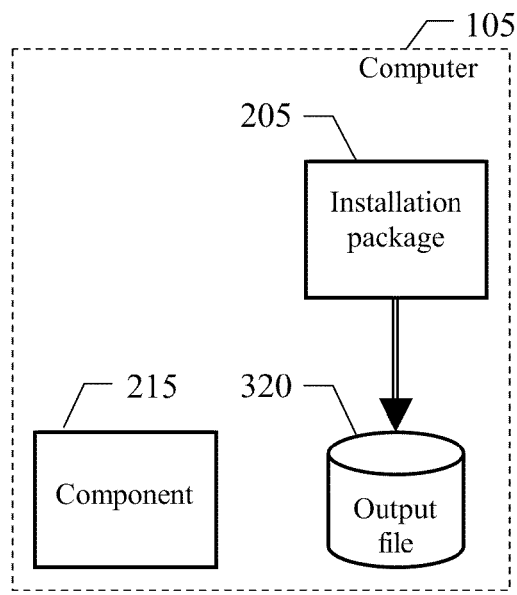
FIGS. 3A-3D show an exemplary application of an embodiment of the invention.
Figure 3B:
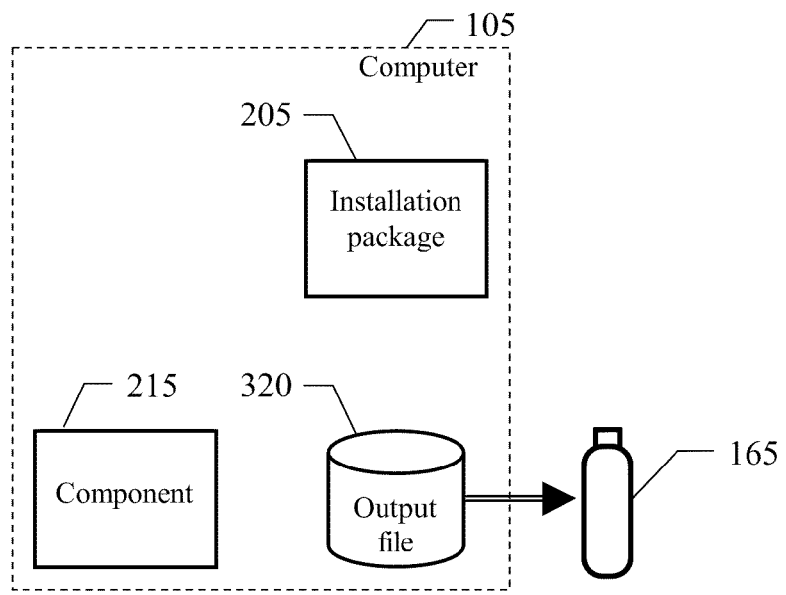

Referring now to FIG. 3A, the output information generated by the installation package 205 after installation of the component 215 may be stored on an output file 320 on the computer 105, such as its hard disk. As shown in FIG. 3B, the system administrator may move (for example, with a cut and paste operation) the output file 320 to a removable memory device, such as a pen-drive 165.

Figure 3C:
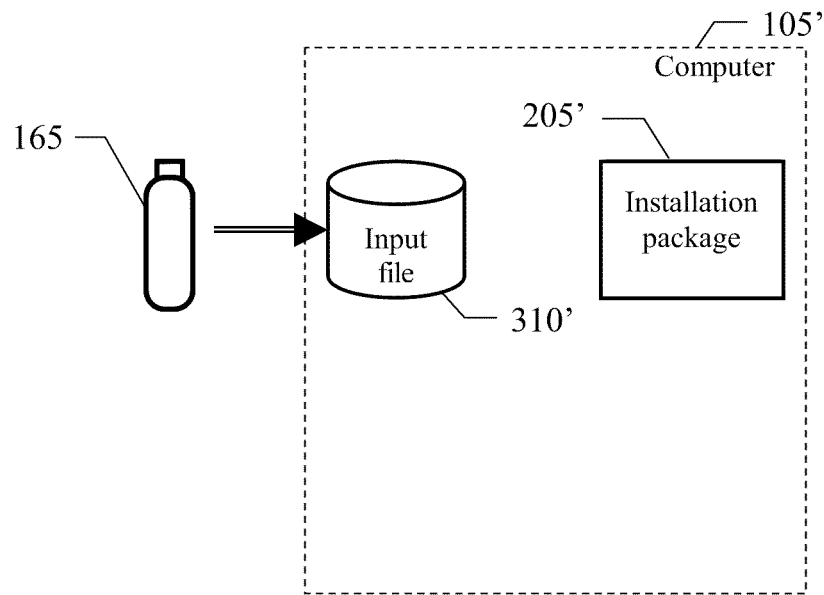

With reference now to FIG. 3C, the pen-drive 165 may be taken to the second computer 105'. The output file of the first computer 105 may then be loaded from the pen-drive 165 into the second computer 105', as an input file 310' for the corresponding installation package 205'.

Figure 3D:
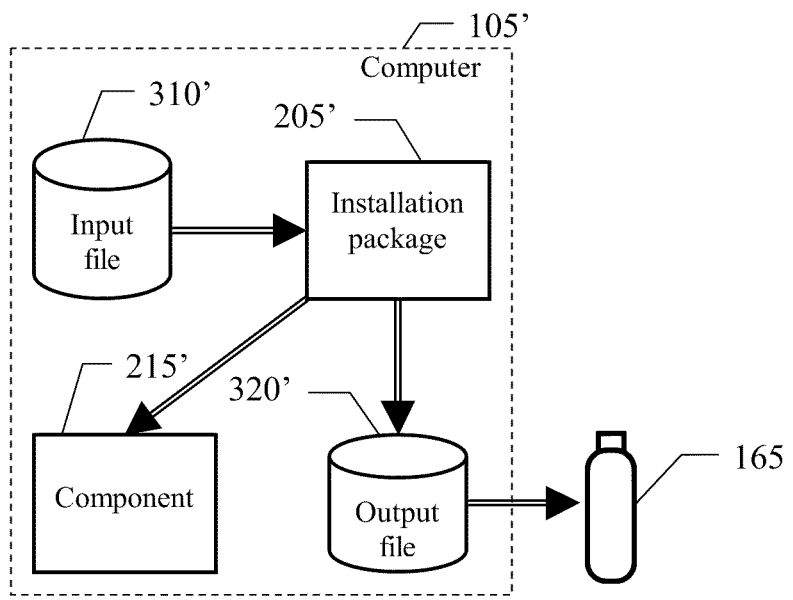

Referring now to FIG. 3D, the installation package 205' may determine the input information required for installation of the component 215' according to the content of the input file 310', with possible additional input information collected at run-time. As above, the installation package 205' may install and configure the component 215' accordingly. The installation package 205' may then generate output information stored on an output file 320'. The output file 320' may be moved to the pen-drive 165 for iteratively performing the foregoing operations until the whole application has been installed.

Advantageously, embodiments of the present invention are very simple. As set forth in the preceding example, no interconnection between the different computers may be required for passing the required information.

Figure 4A:
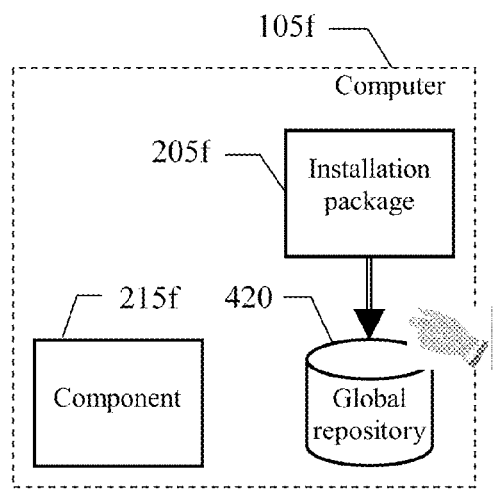
FIGS. 4A-4F show an exemplary application of a further embodiment of the invention.

Another exemplary application of an embodiment of the invention utilizing a network connection is shown in FIGS. 4A-4F. Particularly, FIG. 4A illustrates the situation arising just after a first component 215f of the application has been installed on a first computer 105f by the corresponding installation package 205f. In this case, the output information generated by the installation package 205f after installation of the component 215f may be stored in a global repository 420 on the computer 105f. The installation package 205f may also grant public shared access to the global repository 420, as indicated by a small hand in the figure.

Figure 4B:
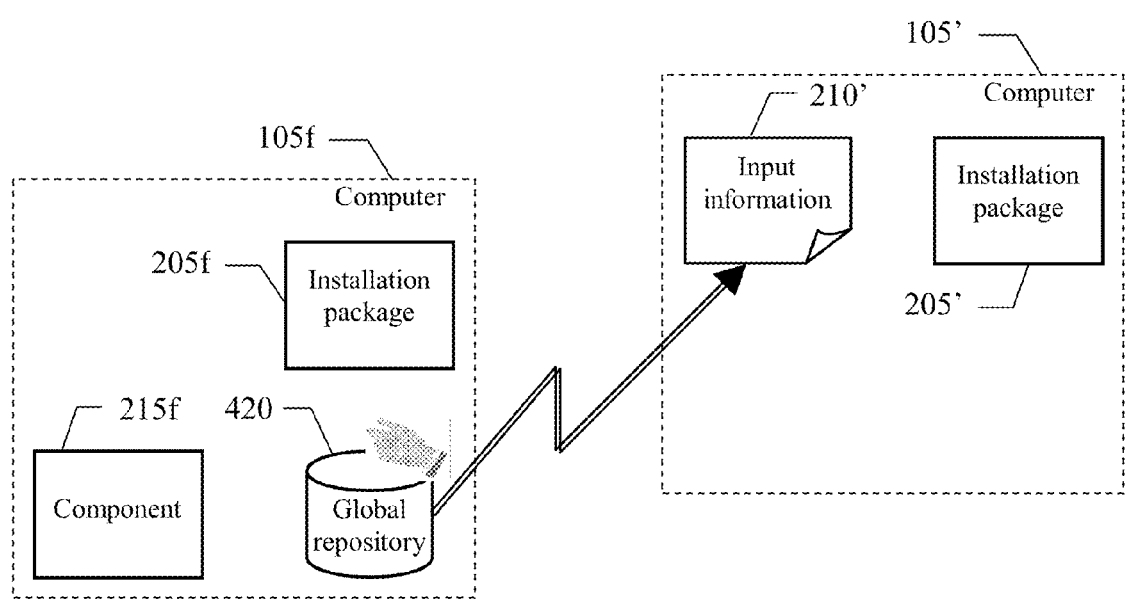

FIG. 4B illustrates a second computer 105' for installing a second component. The second computer 105' may download the output information of the first component 215f from the global repository 420. In some embodiments, a very simple protocol, such as the Trivial File Transfer Protocol ("TFTP"), may be used for this purpose. The installation package 205' may then determine the corresponding input information 210' according to the downloaded information, with the possible addition of further information collected at run-time.

Figure 4C:
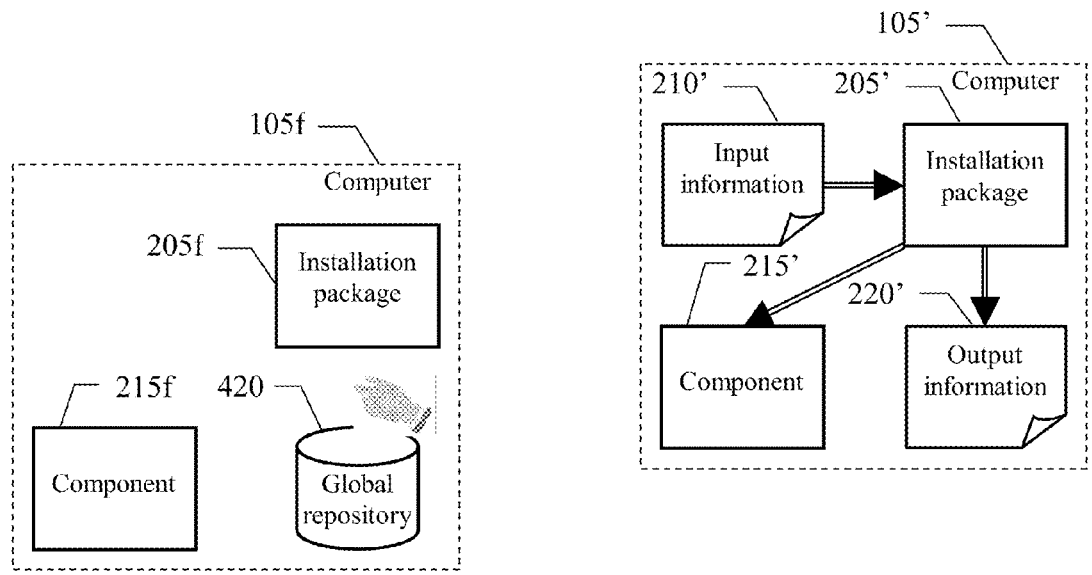

Referring now to FIG. 4C, the installation package 205' may install and configure the component 215' accordingly, and generate the corresponding output information 220', as described above.

Figure 4D:
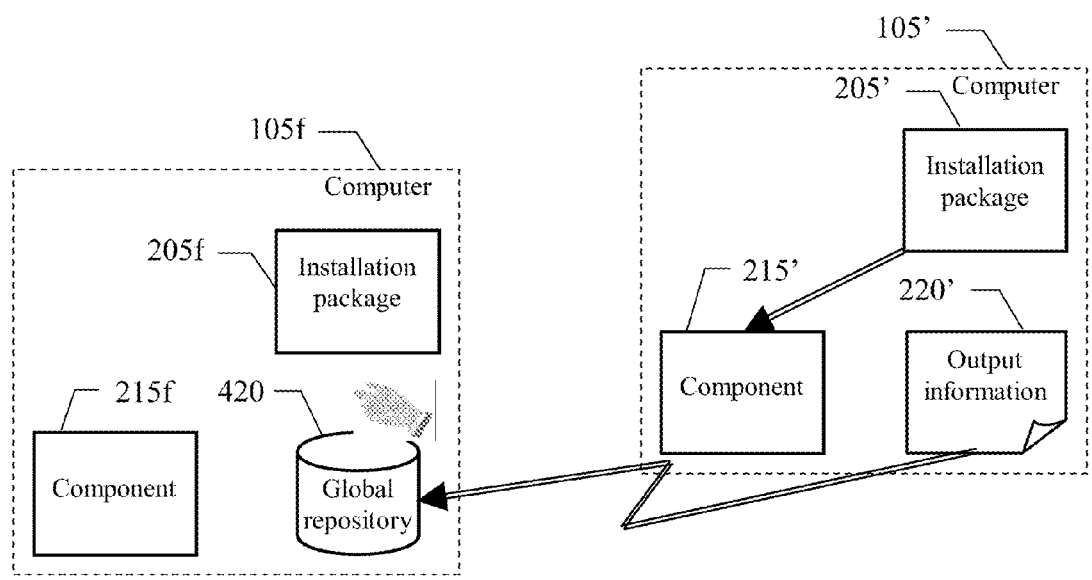

Referring now to FIG. 4D, the output information 220' may be uploaded from the second computer 205' onto the first computer 205*f*. The global repository 420 may then be updated accordingly. For example, the output information 220' may only include any new global configuration parameters that have been entered on the second computer 105', and a new status indicator relating to the installation of the component 215' (so as to limit the network traffic). In this case, the global repository 420 may be updated by adding the new global configuration parameters (if any) and the new status indicator.

Figure 4E:
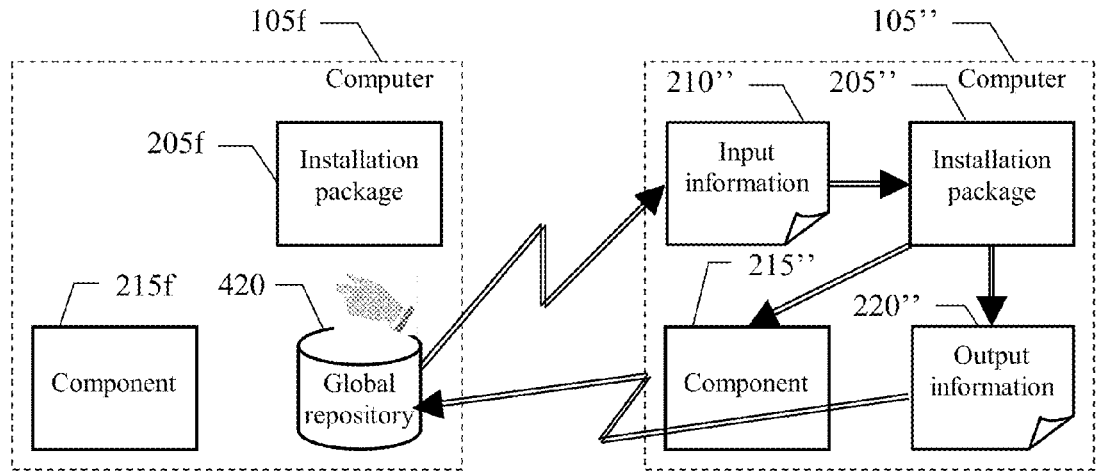

As shown in FIG. 4E, the same operations may be repeated for each other component to be installed on a corresponding computer. Particularly, a third computer 105" may again download the output information of the corresponding preceding component from the global repository 420, which output information may be used by the installation package 205" to determine the corresponding input information 210". The installation package 205" may then install and configure the component 215", and may generate the corresponding output information 220". The output information 220" may be uploaded from the second computer 205" onto the first computer 205*f* to update the global repository 420 accordingly.

Figure 4F:
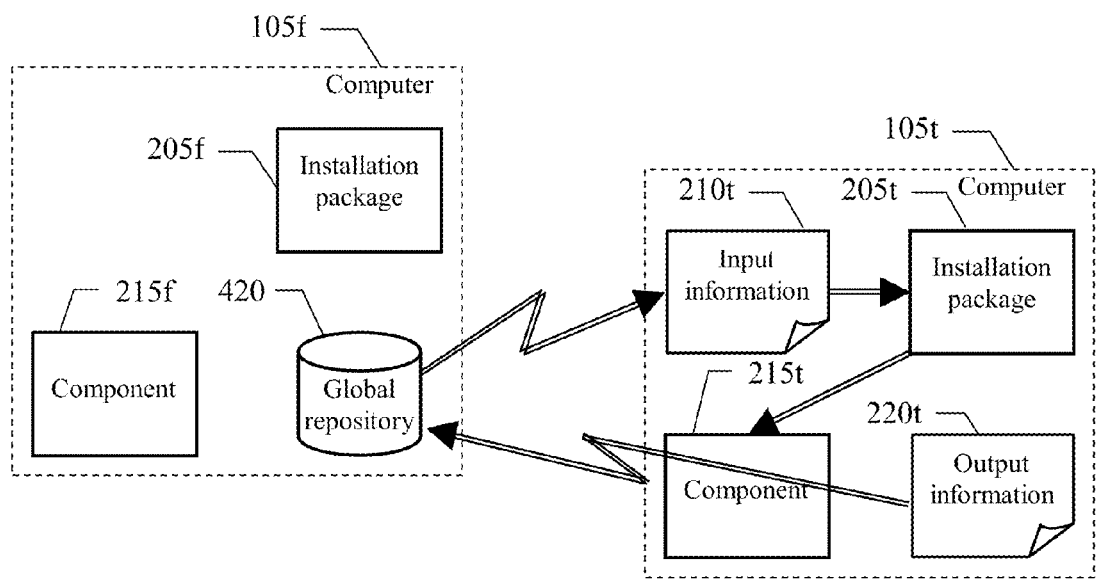

Referring now to FIG. 4F, a final component of the application may likewise be installed on a corresponding final computer 105*t*, as above, by downloading the output information of the corresponding preceding component on the computer 105*t* from the global repository 420. This output information may then be used to determine the relevant input information 210*t*. The component 215*t* may be installed and configured by the installation package 205*t* accordingly, and the corresponding output information 220*t* may be generated. The output information 220*t* from the computer 105*t* may be uploaded onto the first computer 105*f*, and the global repository 420 may be updated accordingly. Moreover, in some embodiments, the installation package 205*f* may also remove shared access to the global repository 420, as indicated by the deletion of the corresponding small hand in the figure.

As described above, embodiments of the present invention may enable required information to be passed between the different components substantially automatically. Nevertheless, in some embodiments, identifying the first computer on each subsequent computer may be required.

Figure 5A:
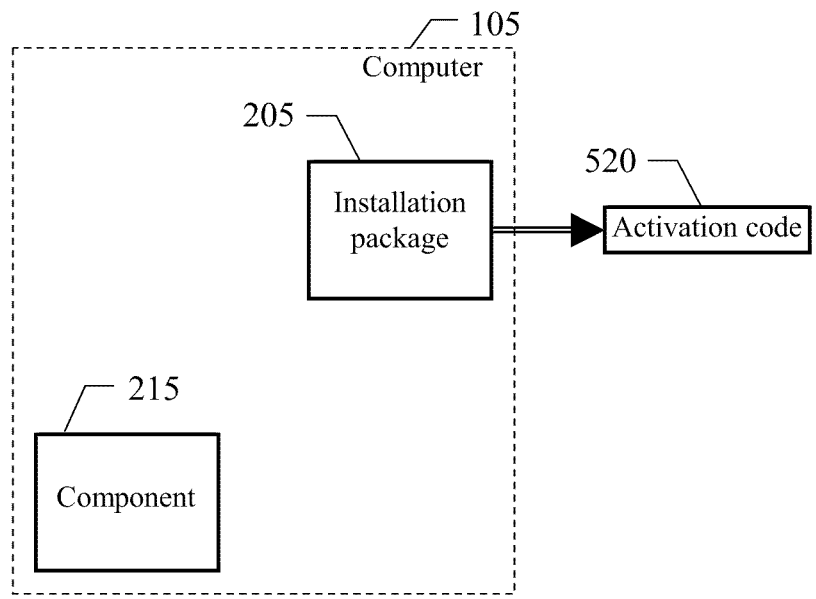
FIGS. 5A-5C show an exemplary application of a still further embodiment of the invention.
Figure 5B:
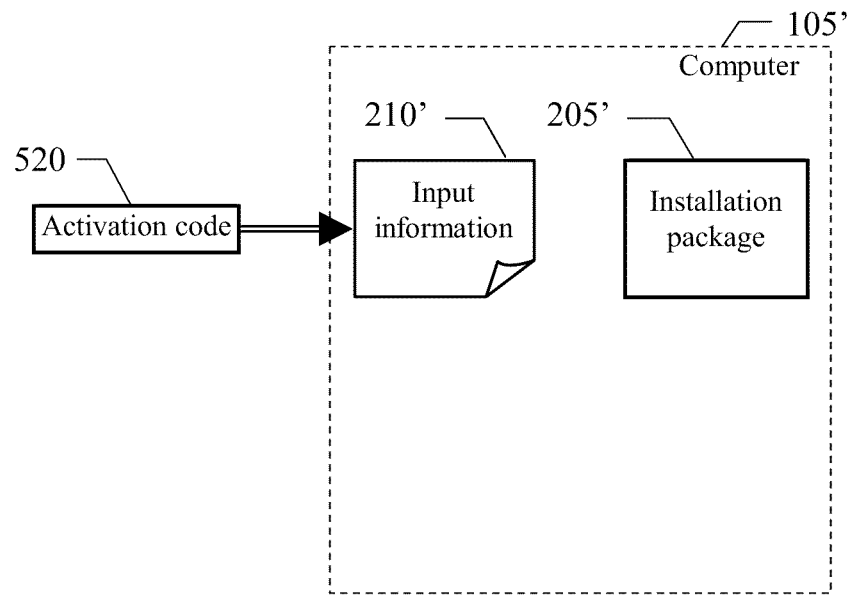
Figure 5C:
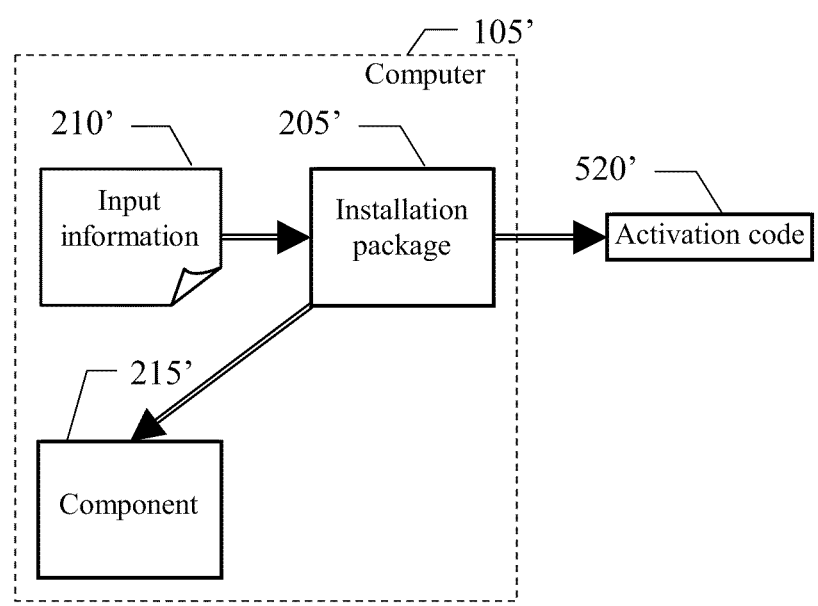

Referring now to FIGS. 5A-5C, an exemplary application of an embodiment of the invention may include a manual transfer. As shown in FIG. 5A, the output information generated by the installation package 205 after installation of the component 215 may be displayed as an activation code 520 on the computer 105. In one embodiment, for example, the activation code 520 may be displayed on the computer 105 monitor for possible printing.

With reference to FIG. 5B, upon launching the installation package 205' on the computer 105', the system administrator may be prompted to enter the activation code 520 of the preceding component. This activation code 520 may be used to determine the input information 210' required for installation of the corresponding component (with possible additional input information collected at run-time).

Moving now to FIG. 5C, the installation package 205' may install and configure the component 215' as set forth above. The corresponding output information generated by the installation package 205' may be displayed as another activation code 520' on the computer 105'. This activation code 520' may be used to iteratively perform the same operations on additional computers until the entire application has been installed.

This technique may be very effective when the amount of information to be passed along the components is small, for example, where the information consists only of the status indicators.

Figure 6:
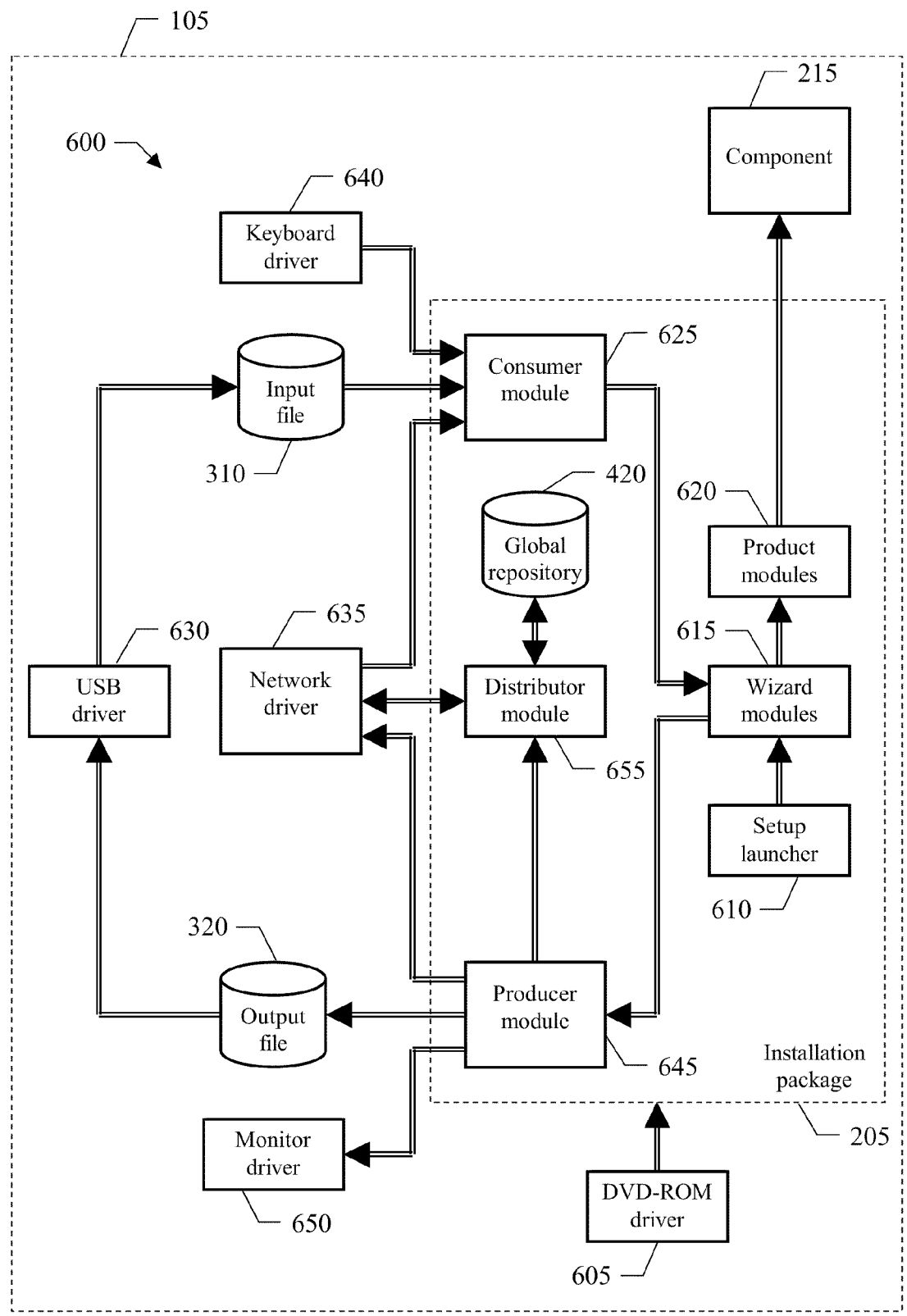
FIG. 6 depicts main software components that may be used to implement embodiments of the invention.

FIG. 6 illustrates the main software components 600 that may be used to implement an embodiment of the invention on a generic computer 105. The information (programs and data) may be stored on the hard disk. This information may be loaded, at least partially, into the working memory of the computer 105 when the programs are running, together with an operating system and other application programs (not shown). The programs may be initially installed onto the hard disk from DVD-ROM, for example.

Particularly, a DVD-ROM driver 605 may be used to load the installation package 205 onto the computer 105 from one or more DVD-ROMs. The installation package 205 may include a setup launcher 610, which may begin execution of the installation package 205. Further, the setup launcher 610 may possibly extract the information embedded into it, such as when the installation package 205 is distributed as a single self-extracting file.

Wizard modules 615 may define panels to be displayed and/or actions to be performed during the installation process. In some embodiments, such as the "InstallShield," the wizard modules 615 may include Java Beans organized into a wizard tree. The wizard modules 615 may be used, for example, to display a welcome message, approve a usage license, select the desired features of the component, enter its local configuration parameters, invoke the installation of the selected features, and the like.

Product modules 620 may define functions implementing the installation of different features of the component. In some embodiments, such as the "InstallShield," the product modules 620 may include further beans organized into a product tree. The product modules 620 may contain data to be used and may define the operations to be performed during the installation process. For example, product modules 620 may include files to be added, instructions for creating desktop icons, modifying registry entries, and the like.

In one embodiment of the invention, the installation package 205 may also include a consumer module 625. The consumer module 625 may include, for example, an additional wizard bean, which may be added at the beginning of the wizard tree just after some standard wizard beans. The consumer module 625 may be used to determine the corresponding input information from the output information of the preceding component, as described above. Particularly, in one embodiment, the consumer module 625 may read the corresponding input file 310 that may be loaded onto the computer 105 from a removable memory device, such as a pen-drive (not shown), via a USB driver 630. The consumer module 625 may download the output information from the first computer (not shown) through a network driver 635, or may receive the corresponding activation code entered with a keyboard (not shown) via a keyboard driver 640.

The installation package 205 may also include a producer module 645 (for example, consisting of an additional wizard bean added at the end of the wizard tree). The producer module 645 may be used to provide the output information for a subsequent component as set forth above. Particularly, in one embodiment, the producer module 645 may write the corresponding output file 320, which may then be moved to the pen-drive through the USB driver 630. The producer module 645 may upload the output information onto the first computer through the network driver 635, or may display the corresponding activation code on a monitor (not shown) via a monitor driver 650.

In an embodiment utilizing a network connection for passing the information between the components, the installation package 205 used to install the first component may also include a distributor module 655. In one embodiment, the distributor module 655 may, for example, consist of an additional wizard bean added to the wizard tree just after the producer bean. The distributor module 655 may receive the output information of the first component from the producer module 645 and store it into the global repository 420. The distributor module 655 also controls the shared access to the global repository 420. The distributor module 655 may then extract the current output information from the global repository 420 and download it to each subsequent computer via the network driver 635. The distributor module 655 may receive the corresponding output information from the same computer through the network driver 635, and may update the global repository 420 accordingly.

Figure 7A:
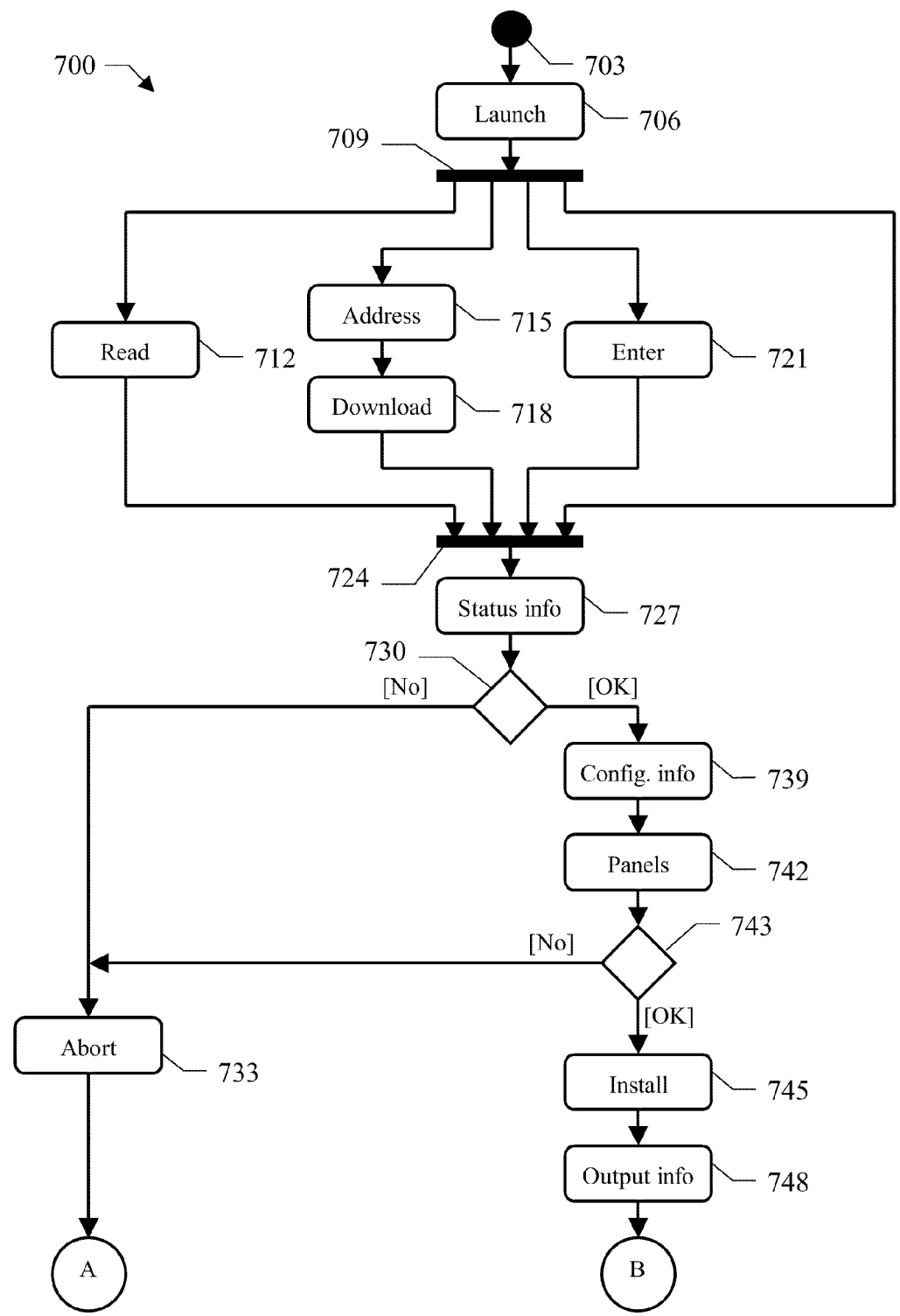
FIGS. 7A-7B are diagrams illustrating a flow of activities relating to an embodiment of the invention.
Figure 7B:
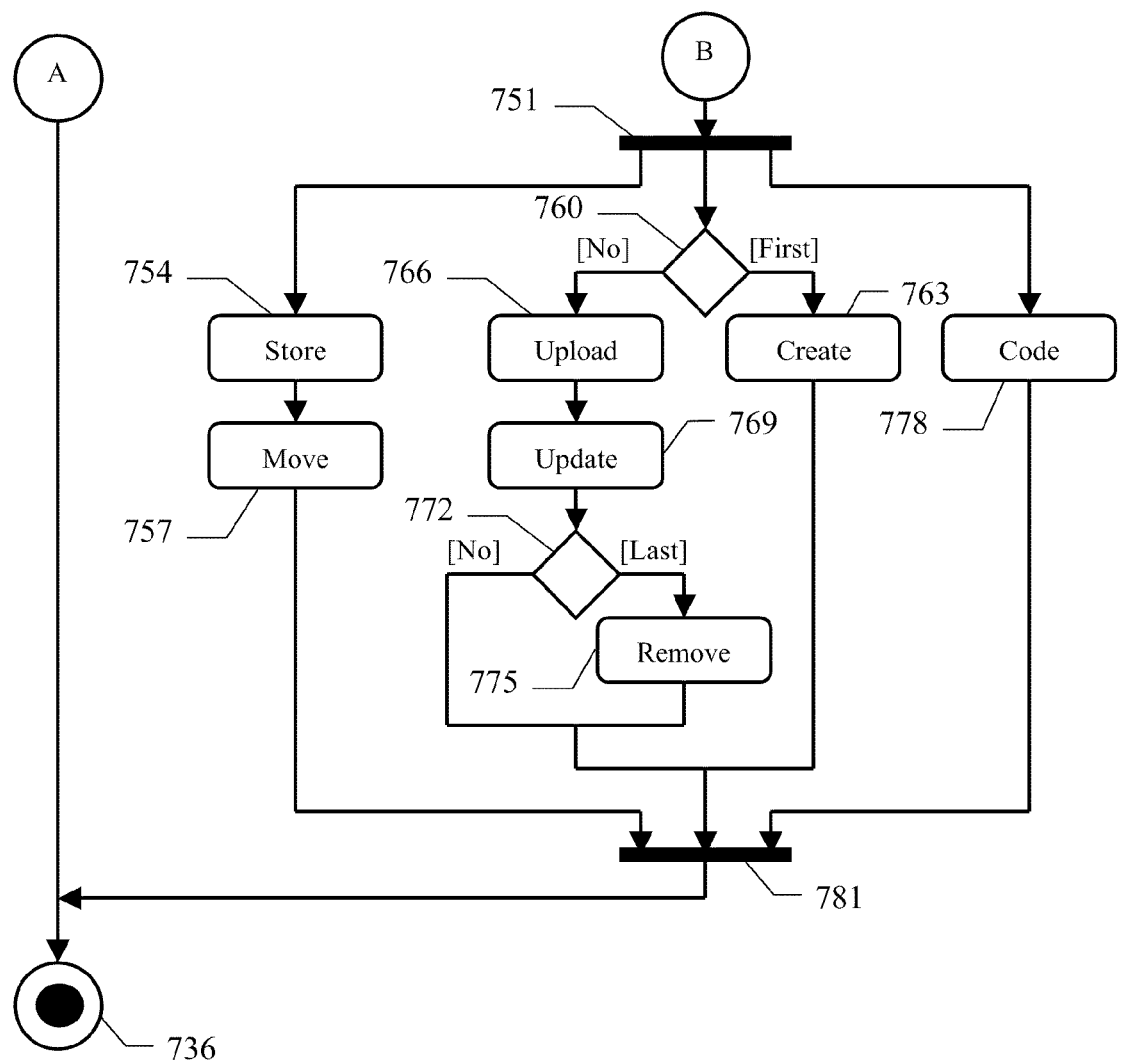

FIGS. 7A and 7B illustrate a method 700 for installing a generic component of an application on a corresponding computer in accordance with embodiments of the invention. The method may begin at the black start circle 703, and then continue to block 706 upon the system administrator invoking the setup launcher of the installation package. In response, the setup launcher may extract the information embedded into it (if necessary), and pass control to its wizard modules to invoke the consumer module.

The flow of activity may fork at the synchronization bar 709 according to the implementation of the installation package. Particularly, in an embodiment utilizing a removable memory device, the input file may be read 712 from the pen-drive to extract the corresponding input information. In an embodiment utilizing a network connection, the system administrator may instead be prompted 715 to enter an address of the first computer where a corresponding component of the application has been installed. This address may include, for example, its Uniform Resource Locator ("URL"). The output information of the preceding component may then be downloaded 718 from the first computer.

Considering now an embodiment utilizing manual transfer, the system administrator may be prompted at block 721 to enter the activation code of a preceding component. In any case, the disparate flows of activity may then rejoin at the synchronization bar 724.

The same point may also be reached directly from the synchronization bar 709 when no input information is available. Typically, this may occur upon installing the first component of the application, since no preceding component has been installed. In this case, however, the above-described techniques may also be used to pass information to the first component. For example, the first computer designated for installation of the first component may be provided with output information of a last component of a preceding instance of the same, previously-installed application (i.e., with the pen-drive, the network connection, or the activation code). This additional feature may facilitate simple replication of the application configuration on different installations.

Moving now to block 727, the status indicators (representing the current status of the installation of the application) may be extracted from the received input information. The method may verify 730 whether global conditions for enabling the installation of the component (for example, the availability of corresponding prerequisite components) have been met. If not, installation of the component may be aborted 733. Execution of the installation package may end at the concentric white/black stop circles 736.

Conversely, if installation of the component is enabled, the global configuration parameters (entered during installation of the preceding components) may be extracted from the received input information. The consumer module may disable 742 the wizard modules intended to collect the global configuration parameters already available. The (enabled) wizard modules may then be invoked as usual. In this way, the wizard modules may only collect the missing input information, if any.

For example, the system administrator may be prompted to enter new global configuration parameters and/or local configuration parameters through corresponding panels. Moreover, it may be possible to scan the computer to automatically determine any required environmental indicators. The method may verify 743 whether local conditions for enabling installation of the component (i.e., availability of the required hardware and/or software characteristics of the computer) have been met. If not, installation of the component may likewise be aborted 733, and the method may end at the stop circles 736.

Conversely, the product modules required to install and configure the selected features of the component may be invoked 745. The producer module may then be invoked, which may generate 748 the corresponding output information accordingly.

The flow of activity may again fork at the synchronization bar 751 according to the features of the installation package. Particularly, steps 754 and 757 may be executed in the embodiment utilizing the removable memory device, steps 760, 763, 766, 769, 772 and 775 may be executed in the embodiment utilizing a network connection, and step 778 may be executed in the embodiment utilizing manual transfer. In any case, the method may continue jointly at the synchronization bar 781, ending at the stop circles 736.

Referring now to the embodiment utilizing the removable memory device, the output information may be stored 754 into the output file. The output file may then be moved 757 to the pen-drive prior to reaching the synchronization bar 781.

Referring not to the embodiment utilizing the network connection, the method may branch 760 according to the type of component that has been installed. Particularly, in the case of the first component, the global repository may be created 763 by adding the corresponding output information, and then proceeding to the synchronization bar 781. Alternatively, the output information may be uploaded 766 onto the first computer. In response, the first computer may update 769 the global repository. When the component is the last one of the application, as determined by test block 772, the first computer may also remove 775 shared access to the global repository. The branch may then end with the synchronization bar 781 from step 775, or directly from step 772 when the component is not the last one of the application.

Referring now to the embodiment utilizing manual transfer, the output information may be displayed 778 on the monitor of the computer. The method may then proceed to the synchronization bar 781.

Naturally, in order to satisfy local and specific requirements, a person skilled in the art may apply to the embodiments described above many logical and/or physical modifications and alterations. More specifically, although the present invention has been described with a certain degree of particularity with reference to specific embodiment(s), it should be understood that various omissions, substitutions and changes in the form and details as well as other embodiments are possible. Particularly, embodiments of the invention may even be practiced without the specific details (such as the numerical examples) set forth in the preceding description. Conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

For example, the proposed embodiments may be implemented with an equivalent method by using similar steps, removing some non-essential steps, or adding further optional steps. Moreover, the steps may be performed in a different order, concurrently or in a fully or partially interleaved manner.

Similar considerations may apply to the installation of a software application that includes any number of software components (for example, a content management application with multiple client-side components interacting with one or more server-side components). In one embodiment, for example, each component may be installed in a console mode by exploiting a Command Line Interface ("CLI"), or in a silent mode using predefined input information read from a response file.

More generally, the output information of each preceding component may be provided to one or more computers designated for installation of subsequent components, and each subsequent component may receive output information from one or more preceding components. In any case, the input information of each subsequent component (or at least part thereof) may be determined from the output information of the corresponding preceding component in any substantially equivalent manner (for example, by applying conversion functions if necessary).

The input and/or output information being passed between the components may include any substantially equivalent information indicating the current status of the installation of the application, or at least the current status of the components that may be relevant for continuation of the installation process. In some embodiments, this information may be provided in the form of a table. In any case, this status information may then be used to condition installation of the components by, for example, verifying the absence of incompatible ex-requisite components.

Likewise, the information passed between components may include any substantially equivalent information for configuring the components. In some embodiments, for example, the information may include an address of a central server, a layout of a common user interface on different client computers, or the like.

More generally, the input/output information may include the status indicators only, the configuration parameters only, or any other useful information, such as a common license key. This information may be collected upon installation of the first component, when it is actually necessary for installation of a specific component, or at any other time known to those in the art.

Similar considerations may apply where a substantially equivalent removable memory device, such as a CD-ROM, may be used to transfer the output file.

In some embodiments, a copy of the output file may be maintained on the preceding computer. In other embodiments, another transfer protocol (such as "HTTP") may be used to exchange the output information with the first computer storing the global repository. In certain embodiments, the global repository may be erased from the first computer after installation of the last component of the application.

In one embodiment, the address of the first computer may be stored in a file that is moved to the subsequent computers (for example, with the pen-drive), so as to avoid repetitive typing. The activation code may be displayed and/or entered with any output device and input device, respectively (such as a voice synthesizer and a speech recognizer).

More generally, various techniques may be used to pass the input/output information between the components. For example, the above-described techniques may be implemented independently or in combination with one another with respect to different computers. It may also be possible to store the input/output files in a shared folder of the network, to provide a service (at a predefined address) for managing the global repository, and so on.

In some simplified embodiments, determining the input information of the first component from the output information of the last component of a preceding instance of the application may not be possible. This may be the case where, for example, installation of each instance of the application is stand-alone and requires collecting the input information of the first component.

Similar considerations may apply where the program (which may be used to implement each embodiment of the invention) may be structured differently, or where additional modules or functions may be provided. Likewise, the memory structures may be of other types, or may be replaced with equivalent entities (not necessarily consisting of physical storage media). In any case, the program may take any form suitable for use by any data processing system, or in connection therewith, for example, within a virtual machine. Particularly, the program may be in the form of external or resident software, firmware, or microcode (either in object code or in source code, for example, to be compiled or interpreted.

Moreover, the program may be provided on any computer-usable medium or element suitable to contain, store, communicate, propagate, or transfer the program. For example, the medium may be electronic, magnetic, optical, electromagnetic, infrared, or a semiconductor-type. Examples of such a medium include fixed disks (where the program may be pre-loaded), removable disks, tapes, cards, wires, fibers, wireless connections, networks, broadcast waves, and the like. In any case, embodiments of the present invention may be implemented with a hardware structure (for example, integrated into a semiconductor chip), or with a combination of software and hardware.

Although reference has been made in the description to a specific installer, it should be understood that embodiments of the invention may be implemented with installation packages based on various commercial products (for example, "InstallAnywhere," "Wise Installation System," or "Setup Builder"), or with any other such structures known to those in the art.

Embodiments of the invention may also be carried out on a system having a different architecture or including substantially equivalent units (for example, based on the Internet). Moreover, each computer may have a unique structure, or may include similar elements (such as cache memories temporarily storing the programs or parts thereof). In any case, it may be possible to replace the computer with one or more data processing entities, or with a combination thereof (such as a multi-tier architecture, a grid computing infrastructure, or the like).

The invention claimed is:

1. A computer-implemented method for installing a software application on a data processing system comprising a plurality of data processing entities, the software application including a plurality of software components for installation on the data processing entities, the computer-implemented method comprising:
   providing first input information needed to install a first software component on a first data processing entity;
   installing the first software component on the first data processing entity using the first input information;
   generating, upon installing the first software component, output information related to the installation of the first software component on the first data processing entity, the output information describing the configuration of the first software component on the first data processing entity as determined at the time of installation;
   providing the output information to a second data processing entity on which a second software component is to be installed; and
   determining, from the output information, at least a portion of second input information needed to install the second software component on the second data processing entity.

2. The computer-implemented method of claim 1, wherein at least one of the output information and the first and second input information comprises global status information indicating a current status of the installation of the software application.

3. The computer-implemented method of claim 2, further comprising one of enabling and preventing installation of the second software component based on the global status information.

4. The computer-implemented method of claim 1, wherein at least one of the output information and the first and second input information comprises global configuration information to enable software components to interact with one another.

5. The computer-implemented method of claim 4, wherein installing the first software component comprises configuring the first software component according to the global configuration information.

6. The computer-implemented method of claim 1, wherein providing the output information further comprises:
   copying the output information to a local memory device of the first data processing entity; and
   copying the output information from the local memory device to the second data processing entity.

7. The computer-implemented method of claim 6, wherein copying the output information from the local memory device further comprises:
   copying the output information from the local memory device to a removable memory device; and
   copying the output information from the removable memory device to the second data processing entity.

8. The computer-implemented method of claim 1, wherein providing the output information further comprises:
   storing the output information on a global memory device accessible to both the first and second data processing entities.

9. The computer-implemented method of claim 8, wherein providing the output information to the second data processing entity comprises downloading the output information from the global memory device.

10. The computer-implemented method of claim 1, wherein providing the output information further comprises:
   providing an activation code that contains at least a portion of the output information; and
   entering the activation code into the second data processing entity.

11. A computer program product for installing a software application on a data processing system comprising a plurality of data processing entities, the software application comprising a plurality of software components for installation on the data processing entities, the computer program product comprising:
   a non-transitory computer-readable medium having computer-usable program code embodied therein, the computer-usable program code comprising:
      computer-usable program code for providing first input information needed to install a first software component on a first data processing entity;
      computer-usable program code for installing the first software component on the first data processing entity using the first input information;
      computer-usable program code for generating, upon installing the first software component, output information related to the installation of the first software component on the first data processing entity, the output information describing the configuration of the first software component on the first data processing entity as determined at the time of installation;
      computer-usable program code for providing the output information to a second data processing entity on which a second software component is to be installed; and
      determining, from the output information, at least a portion of second input information needed to install the second software component on the second data processing entity.

12. The computer program product of claim 11, wherein at least one of the output information and the first and second input information comprises global status information indicating a current status of the installation of the software application.

13. The computer program product of claim 12, further comprising computer-usable program code for one of enabling and preventing installation of the second software component based on the global status information.

14. The computer program product of claim 11, wherein at least one of the output information and the first and second input information comprises global configuration information to enable software components to interact with one another.

15. The computer program product of claim 14, wherein installing the first software component comprises configuring the first software component according to the global configuration information.

16. The computer program product of claim 11, wherein the computer-usable program code for providing the output information further comprises:
   computer-usable program code for copying the output information to a local memory device of the first data processing entity; and
   computer-usable program code for copying the output information from the local memory device to the second data processing entity.

17. The computer program product of claim 16, wherein the computer-usable program code for copying the output information from the local memory device further comprises:
   computer-usable program code for copying the output information from the local memory device to a removable memory device; and computer-usable program code for copying the output information from the removable memory device to the second data processing entity.

18. A system for installing a software application on a data processing system comprising a plurality of data processing entities, the software application comprising a plurality of software components for installation on the data processing entities, the system comprising:

a plurality of modules, each module implemented in at least one of hardware and a combination of hardware and software, the modules comprising:

an input unit for providing first input information needed to install a first software component on a first data processing entity;

a product module for installing the first software component on the first data processing entity using the first input information;

a producer module for generating, upon installing the first software component, output information related to the installation of the first software component on the first data processing entity, the output information describing the configuration of the first software component on the first data processing entity as determined at the time of installation;

a transfer unit for providing the output information to a second data processing entity on which a second software component is to be installed; and a consumer module for determining, from the output information, at least a portion of second input information needed to install the second software component on the second data processing entity.

19. The system of claim 18, wherein the transfer unit is selected from the group consisting of a removable memory device, a network connection, and a manual input device.

* * * * *